Dec. 1, 1964 C. E. RAHAUSER ETAL 3,159,007
MACHINE AND PROCESS FOR MAKING FROZEN
CONFECTION PRODUCT AND THE LIKE
Filed June 1, 1962 2 Sheets-Sheet 1
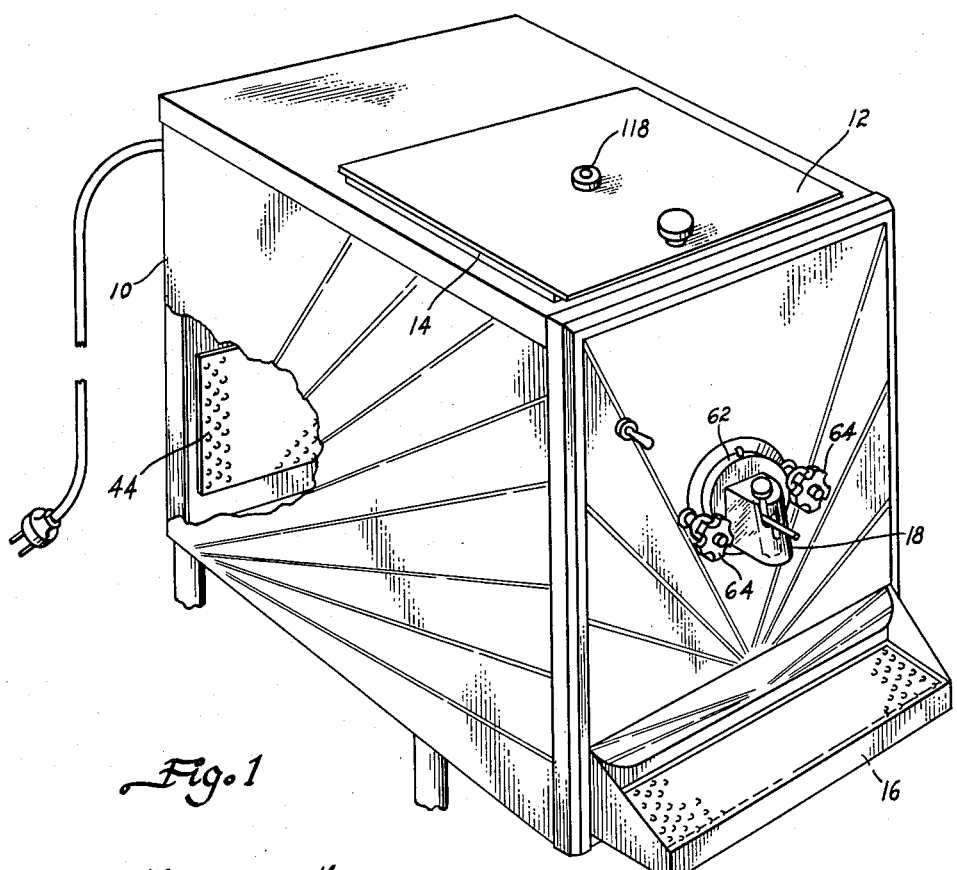
Fig. 1
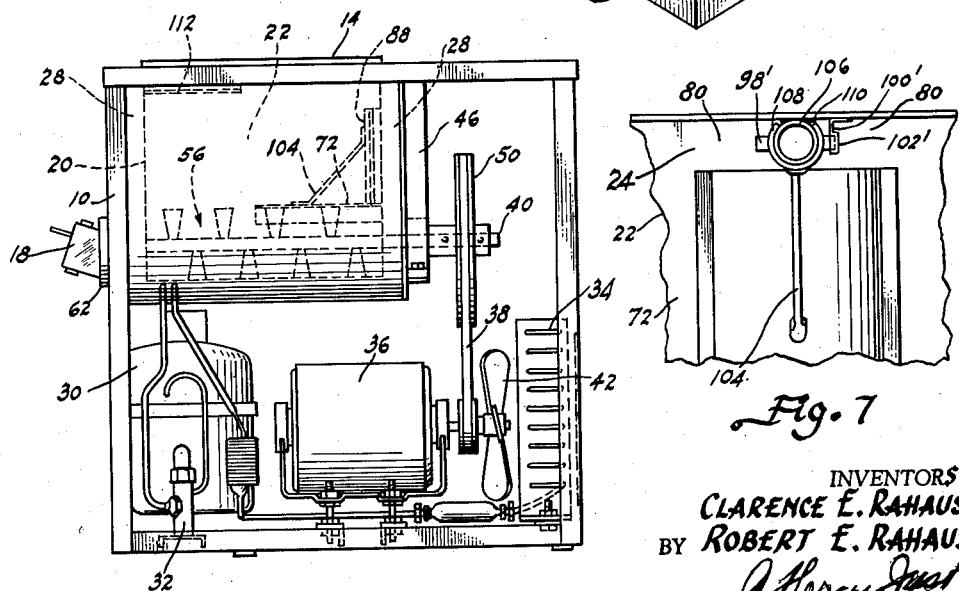
Fig. 2
Fig. 7
INVENTORS
CLARENCE E. RAHAUSER
BY ROBERT E. RAHAUSER
ATTORNEY

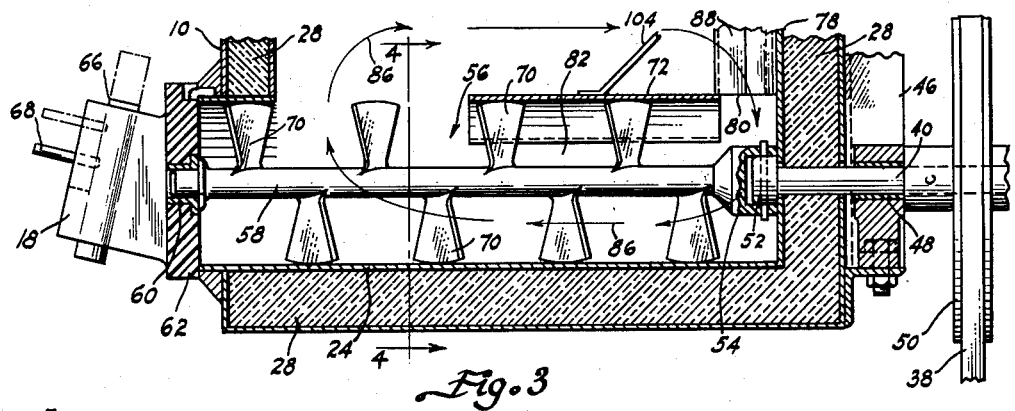
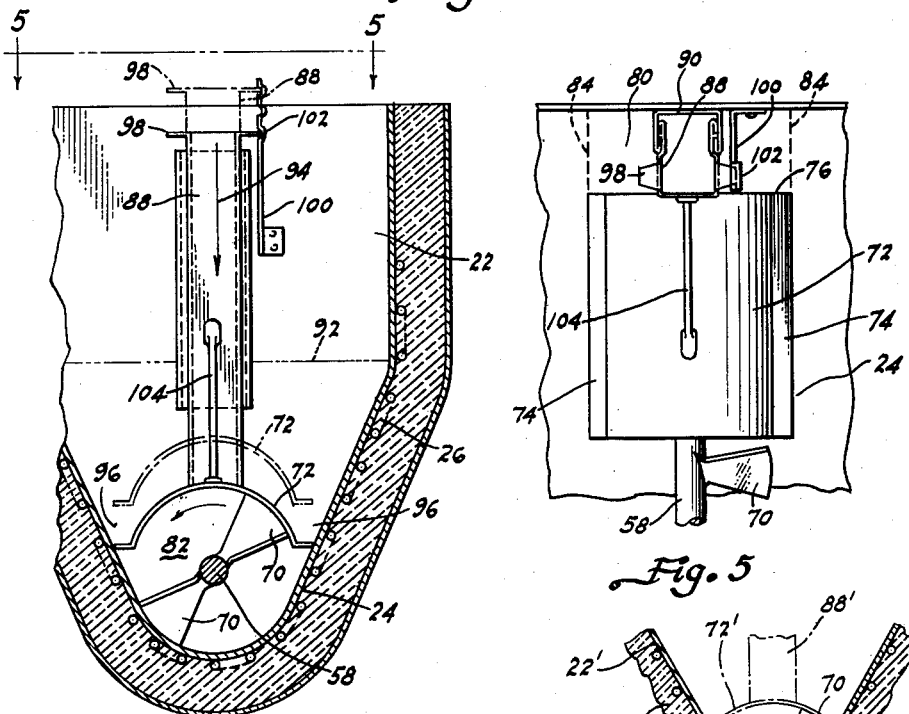
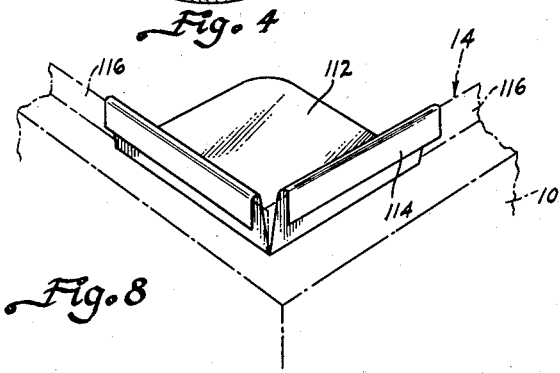
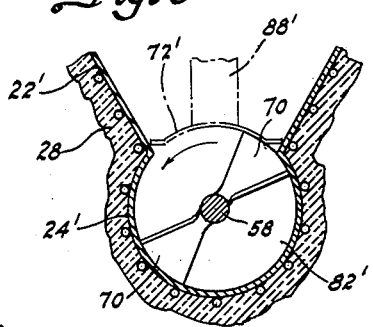
INVENTORS
CLARENCE E. RAHAUSER
BY ROBERT E. RAHAUSER
ATTORNEY

United States Patent Office 3,159,007
Patented Dec. 1, 1964

3,159,007
MACHINE AND PROCESS FOR MAKING FROZEN CONFECTION PRODUCT AND THE LIKE
Clarence E. Rahauser, 35 N. Lehman St., and Robert E. Rahauser, 1131 Locust Grove Road, both of York, Pa.
Filed June 1, 1962, Ser. No. 199,432
14 Claims. (Cl. 62—69)

This invention pertains to both a machine and process for making frozen confection products such as milk shakes of various consistencies and thickness and also frozen ice cream and water ices, and soft ice cream and/or frozen custard. Primarily, the machine and process comprising the present invention principally are concerned with the introduction of overrun into the frozen confection products of the types set forth above.

Overrun in frozen confections such as milk shakes, ice cream, and soft ice cream or frozen custard comprises either air or some other suitable gas which has been introduced into the mix from which the confection product is formed while the same is being beaten or whipped and, preferably, simultaneously chilled during agitation of the same in a suitable freezing compartment or the like. Various attempts have been made with varying degrees of success to introduce air or the like into such so-called frozen confections but most of the machines and processes employed heretofore have included the injection of such air or gas into the product from a suitable source of the air or gas under pressure.

The provision of such a supply of air or gas under pressure involves additional apparatus and, therefore, additional expense. Further, usually such apparatus and processes employed heretofore which involve the introduction of air or other suitable gas under pressure into the mix, while being agitated, require the use of various types of pressure regulating valves and other relatively expensive equipment. Also, when a tank of compressed air or gas is used and the same becomes exhausted beyond further use, it is necessary to have additional tank available to replace the exhausted one, or incur the expense of an air compressor and the operating cost thereof. Another hindrance in at least some of the previously used machines and processes lay in the fact that controlled introduction of the mix usually was necessary incident to the same being aerated to incorporate overun therein.

It is the principal object of the present invention to provide an extremely simple type of machine which operates automatically to produce any desired amount of overrun in a frozen confection product without requiring the use of any external source of air or gas under pressure, but merely utilizing atmospheric air which is available naturally in the machine and progressively is injected by a beating action into any suitable type of readily available ice cream or sherbert mix, a mixture of milk shake ingredients, or the like, to produce a smooth, velvety type of product that is highly palatable to the taste and is profitable from a merchandising standpoint.

Another object of the invention is to provide a preferably trough-shaped freezing compartment having ready access to the atmosphere and into which any desired composition of such mix may be placed to produce a desired type of frozen confection comprising any of the kinds and types referred to above, or the like, and in which compartment the lower portion thereof constitutes the freezing zone in which a simple type of beater or agitator is rotated at least partially within a confined air or gas-entraining region having a constricted mix inlet with which air inlet means are associated, the constricted air inlet means automatically producing a negative pressure within the confined air-entraining region so as to produce such suction adequate to draw air automatically and in desired quantities into the mixture while being beaten. The operation of the device is such that the confection mix is recycled continuously through said confined air-entraining region until a product having a desired amount of overrun is produced.

A further object of the invention is to provide a machine of the type referred to above in which the constricted mix inlet to the confined air-entraining region thereof is adjustable in order that the amount of air and also the rate of entraining of such air into the mixture is adjustable in order that a desired amount of overrun may be incorporated in the confection product within a desired amount of time.

Details of the foregoing objects and of the invention, as well as other objects thereof are set forth in the following specification and illustrated in the accompanying drawings comprising a part thereof.

In the drawings:

FIG. 1 is a perspective exterior view of an exemplary machine embodying the principles of the invention.

FIG. 2 is a vertical side elevation of one side of the machine shown in FIG. 1 with the side cover removed to disclose details of the interior elements of the machine.

FIG. 3 is a fragmentary vertical and sectional view of the lower portion of the machine shown in FIGS. 1 and 2 and particularly the freezing compartment thereof in which air or other suitable gas is beaten into the product to produce overrun therein.

FIG. 4 is a fragmentary vertical transverse sectional view as seen on the line 4—4 of FIG. 3.

FIG. 5 is a fragmentary top plan view of the portion of the machine shown in FIG. 3.

FIG. 6 is a fragmentary vertical sectional elevation of another embodiment of the machine than that shown in FIG. 4 but otherwise showing the same general lower portion of the freezing compartment as that shown in FIG. 4.

FIG. 7 is a fragmentary top plan view similar to that shown in FIG. 5 but illustrating still another embodiment of the portion of the machine shown fragmentarily in FIG. 5.

FIG. 8 is a fragmentary perspective view showing an exemplary deflection member associated with the top of the freezing compartment of the machine.

The drawings illustrate several embodiments of the preferred construction of the machine comprising the present invention. Any appropriate cabinet 10 may be used to contain the essential elements of the machine and, preferably, the same is of a decorative nature. The top of the cabinet is provided with a door or cover 12 which extends across an opening 14 in the top of the cover, said opening being fragmentarily illustrated in FIG. 8. Through this opening, a desired batch of confection mix is introduced to the machine. This batch may be of any suitable type consisting of liquid and dry materials of which may kinds are available for making such frozen confections as ice cream, water ice or sherbert, soft ice cream or frozen custard, or the like. In addition, this machine is capable of making products such as, or similar to, milk shakes produced by introducing principally milk and ice cream into the machine so that the same may be blended incident to being aerated and rendered smooth and of any desired thickness consistency, in addition to being chilled.

The front of the machine is provided with a suitable shelf 16 upon which a cup-like receptacle or container may be placed to receive the chilled or frozen product as dispensed from the nozzle 18, said nozzle communicating with the exit or front end 20 of a preferably trough-shaped receptacle or compartment 22 disposed on the interior of the cabinet 10 and the upper end of which is covered by the door 12. As best shown in FIG. 4, the lower portion of the compartment 22 generally is V-shaped in vertical front elevation and the lowermost portion 24 thereof is a segment of a cylinder and constitutes a freezing zone. Particularly this lowermost portion 24 of the compartment 22 has a plurality of freezing coils 26 directly attached to the exterior thereof and within which refrigerant is circulated, said coils being particularly concentrated adjacent the cylindrical or semi-cylindrical lower portion 24 of the compartment so as to facilitate the chilling as well as freezing of confection in this area of the compartment if freezing thereof is desired as in regard to making ice cream, water ice, and frozen custard.

The freezing coils 24 as well as the other portions of the compartment or receptacle 22 are covered by a layer of adequate thickness of insulation material 28 of suitable nature, all of which is hidden from view within the cabinet 10. Also within the cabinet 10 is the refrigerating mechanism which is best shown in FIG. 2 and is substantially of exemplary nature. This comprises a compressor unit 30, a compressor valve 32, a cooling coil 34 connected by appropriate conduits and other customary refrigerating units to the compressor unit 30. Also contained preferably in the lower portion of the cabinet 10 is an electric motor 36 which, by means of appropriate pulleys and a belt 38 drives agitator shaft 40 and also fan 42 which blows air through the cooling coil 34 to effect heat transfer therewith. Preferably, the cooling coil 34 is positioned adjacent the rear wall of cabinet 10 and said rear wall, as shown fragmentarily in FIG. 1, is provided with appropriate ornamental grill material 44 or the like, whereby the cabinet 10 will be attractive and pleasing in appearance from all sides thereof.

Agitator shaft 40 is supported by a suitable hanger 46 within cabinet 10, the lower end of which supports a bearing 48 within which shaft 40 revolves, this being driven by belt 38 and pulley 50. The inner end of shaft 40 is provided with an appropriate key head 52 which is disposed in socket 54 formed on one end of beater unit 56 which comprises a central shaft 58, the socket 54 being complementary to the key head 52 so as to rotate therewith about the axis of the agitator shaft 40 and beater shaft 58. The forward end of beater shaft 58 revolves within bearing 60 formed within a head 62 which supports the exit nozzle 18. The head 62 may be connected to the front panel of the ornamental cabinet 10 by any suitable means such as a pair of hand nuts 64, shown in FIG. 1. If desired, the head 62 and nozzle structure 18 may be formed unitarily, for example, by molding, from suitable synthetic resin such as methylmethacrylate. The nozzle preferably includes a slidable cut-off plunger 66 operated by a finger-engageable pin 68, best shown in FIGS. 1 and 3, or the equivalent.

The beater unit 56 also comprises a plurality of impeller vanes or blades 70, the outer ends of which are arcuate and preferably are complementary to the segment of the cylinder comprising the lower portion 24 of the freezing zone of compartment 22, as best shown in FIGS 4 and 6. A very slight space may be provided between the ends of the impellers and the interior surface of lower portion 24 to prevent undue wear but, in general, effective scraping of the frozen confection from said wall is accomplished by said impellers. The rotation of the beater unit 56 preferably is in such a direction that the slanted impeller vanes 70 normally move the material or mix in the lower portion 24 of the compartment 22 toward the front or exit end thereof, which movement is toward the left as viewed in FIG. 3.

The principal purpose of the present invention is to introduce overrun into the chilled or frozen confection produced by the machine comprising part of the invention, such introduction being made in accordance with the process likewise comprising part of the invention.

The preferred overrun medium in accordance with the present invention is air, but it is to be understood that other suitable gas may be used for this purpose if desired, in accordance with the principles of the invention.

Further, the overrun medium preferably is introduced automatically and without requiring the same to be under pressure. As illustrated in the drawings, the preferred means for effecting the injection of an overrun medium, such as air into the mix, while being agitated and preferably while being either chilled or frozen, comprises the use of a curved shield 72 which extends preferably from adjacent the rear or right-hand end wall of the compartment 22 as viewed in FIG. 3, toward the exit or front end of said compartment. However, the forward end of the shield 72 terminates a substantial distance from said front end wall of the compartment as is obvious from FIG. 3.

From a practical standpoint, and depending upon the overall length of the interior of the compartment 22, the shield 72 is approximately only about half as long as the length between the interior end walls defining the length of the compartment 22. Also, in cross-section, as best shown in FIG. 4, the curvature of the shield 22 likewise is an arc comprising a segment of a cylinder, the axis of which coincides with the axis of central shaft 58 of the beater unit 56, whereby this shield cooperates with the lowermost portion 24 to define substantially a complete cylinder in cross-section. Further, the opposite edges of the shield 72, with reference to FIG. 4, are provided with extensions 74 which abut the inner surfaces of the lower portion 24 of the compartment 22 when the shield 72 is in its lowermost position which is that shown in full lines in FIG. 4 and also as illustrated in FIG. 3.

In accordance with the preferred construction of the invention, the rear end 76 of shield 72 is spaced a short distance from the interior rear end wall 78 of compartment 22, as best shown in FIG. 5, for purposes of providing inlet openings 80 which permit the ingress of the mix to the confined portion 82 within the lower portion 24 of compartment 22. Said confined portion is that space which is between the lowermost portion 24 of the compartment and shield 72, as best seen in FIG. 3. The inlet openings 80 likewise are illustrated in FIG. 3 as well as in FIG. 5. In the latter figure, it will be visualized that if the shield 72 extended entirely to the rear end wall 78, the lateral edges thereof would engage the walls of the lowermost portion 24 of the compartment along the dotted lines 84. Therefore, from FIG. 5 particularly, it will be seen that the total areas of the two openings 80 are substantially less than the cross-sectional area of the confined portion 82 between the cylindrical segments 24 and 72 as best seen in FIG. 4.

In view of the disparagement between the total areas of inlet openings 80 and the cross-sectional area of the confined portion 82, as the beater unit 56 revolves and the impellers 70 move the mixed material outwardly from the forward end of confined portion 82, which also can be referred to as an agitating region or a beater and air-entraining region, the agitated mix will progressively move through a closed path defined by the arrows 86 in FIG. 3. Because of the freedom of the mix to expand as soon as it leaves the left-hand end of the confined portion 82 as seen in FIG. 3, coupled with the constricting nature of the inlet openings 80, a negative pressure will be produced within the confined portion 82, especially adjacent the right-hand end thereof as viewed in FIG. 3. This negative pressure readily produces a suction effect that is highly conducive to the drawing of atmospheric air into the mixture being agitated within the confined portion 82.

Movement of air into said confined portion 82 is facilitated by the present invention including an unimpeded air-inlet conduit 88 which, preferably, is tubular. In the particular embodiment thereof shown in FIGS. 3–5, this tubular conduit is substantially rectangular in cross-section and is composed of two U-shaped channels as best seen in FIG. 5. The rearmost channel 90 is fixedly secured suitably to the rear wall 78 of the compartment 22 and has appropriate inturned ends to form abutments slidably engaged by complementary edges formed on the opposite side walls of the other U-shaped member comprising the air inlet conduit 88, as shown in FIG. 5, whereby the conduit 88 is vertically slidable relative to the channel or bracket 90 in order that the shield 72 may be elevated in a desired amount from its lowermost position shown in FIG. 3 and in full lines in FIG. 4, to an exemplary adjusted, raised position such as shown, for example, in broken lines in FIG. 4.

The conduit 88 and channel 90 preferably extend to near the upper edge of the compartment 22 as best shown in FIG. 4. Under normal circumstances, the level of the mix introduced into the compartment 22 will be below the upper edge of said compartment, and, only for exemplary purposes, there has been illustrated in FIG. 4 a liquid level line 92. Therefore, since the air inlet means extends above the liquid level 92, it is obvious that unimpeded passage of air will take place downward through said conduit means, in the direction of the arrows 94 in FIG. 4 so as to be introduced by the suction referred above, into the right-hand end of the confined portion 82 shown in FIG. 3 incident to the mix being reintroduced into said confined portion in accordance with the agitation thereof and corresponding movement of the mix along the closed path indicated by the arrows 86 in FIG. 3. Such reintroduction of the mix and the incorporation of air by suction into the confined portion 82 results in the air readily being beaten to a very substantial extent into the mix to produce what is commonly known in the trade as overrun.

The inclusion of air in the mix, whether only chilled, or frozen, produces a very smooth product having a somewhat velvety texture, especially when ice cream, sherberts, or water ices, and soft ice cream or frozen custard are produced. However, where the mix is more fluid than the products just mentioned, such as in the making of milk shakes, the texture thereof will not be as congealed as frozen confections but will be very smooth and is highly capable of being made relatively thick, especially when milk and ice cream, for example, are introduced into the compartment 22 and are beaten and agitated by the operation of machine in accordance with the principles described above.

As has been set forth in the foregoing, the shield 72 may be elevated to adjusted positions above the position shown in FIG. 3 and also, in full lines, in FIG. 4. Such elevation of the shield will space the edges thereof from the sides of compartment 22 and thereby produce additional inlet passages 96 which will permit the introduction of the mix into the confined portion 82 through such passages, in addition to the ingress afforded by inlet openings 80. When such adjusted position of the shield 92 is made, so as to provide the additional inlet passages 96, it is obvious that the confined portion 82 will not be as "starved" for the inlet of mixed material as when the shield 72 is in its lowermost position, thereby resulting in less negative pressure and corresponding suction being produced adjacent the right-hand end of the confined portion 82 as viewed in FIG. 3. Accordingly, less air will be drawn into the mix than under conditions where the shield 72 is in its lowermost position. By such means, the amount of overrun produced in the product therefore may be regulated readily.

To aid in adjusting the position of the shield 72 relative to the confined portion 82, the upper end of the conduit 88 may be provided with any suitable manually-engageable means such as ears 98 which are best shown in FIGS. 4 and 5. There also preferably is associated with one of said ears, for example, position-maintaining means of any appropriate design. One such satisfactory means comprises a flexible blade 100 having suitable indentations 102 arranged in a series for selective engagement thereof with one of the ears 98 as shown in exemplary manner in FIG. 4. The blade 100 may be affixed by any suitable means, for example, to the rear wall 78 of compartment 22.

It will be understood that the shield 72 preferably is secured at its rear end to the lower end of conduit 88, in any suitable manner, as by welding, riveted ears, or the like. Further, to brace the shield 72, which projects forwardly from the conduit 88, any appropriate means such as a diagonally extending rod 104 may be employed. In addition to bracing the outer end of shield 72, the brace rod 104 serves very handily as a manipulating handle for purposes of raising and lowering the shield 72 to any desired position for operation.

In FIG. 6, a slightly different embodiment of beating and air-entraining or agitating region from that shown in FIG. 4 is utilized. It will be seen that the region 24' in FIG. 6 has a greater extent which is cylindrical than the region 24 in FIG. 4. As a result of the greater cylindrical area of the region or lowermost portion 24' in the embodiment of FIG. 6 over that shown in FIG. 4, the shield 72' shown in FIG. 6 may be narrower than the shield 72 shown in FIG. 4, whereby a substantially completely cylindrical confined portion 82' is provided in the lowermost portion of the compartment 22' than is formed in the embodiment shown in FIG. 4. This arrangement in FIG. 6 provides more accurate control of the reintroduction of mix to the confined portion 82' than that which is possible relative to the embodiment shown in FIG. 4. The shield 72' is supported by the lower end of an appropriate air-inlet conduit 88' as in accordance with the embodiment shown in the preceding figures.

Referring to FIG. 7, there is also a somewhat further embodiment of air-inlet conduit which is slightly different from the substantially rectangular one shown in the preceding figures. In FIG. 7, it will be seen that a relatively short tubular bracket 106, which is cylindrical in cross-section, is affixed by soldering, welding, or the like along one side, to the rear wall 78 of the compartment 22. An air-inlet conduit 108, which also is cylindrical in cross-section, is provided with a vertical slot 110 of appreciable width which accommodates the soldered connection of the bracket 106 to the rear wall 78 but permits vertical slidable movement of the conduit 108 and the shield 72 connected to the lower end thereof relative to the bracket 106 and compartment 22.

Preferably, the inner surface of the conduit 108 frictionally engages the exterior surface of the tubular bracket 106 sufficiently to maintain adjusted vertical positioning of the shield 72 relative to the lower portions 24 of the compartment 22. However, if desired, suitable adjustment maintaining means, such as flexible blade 100' having indentations 102' therein, may be employed to engage an appropriate ear 98' at one side of the upper end of the conduit 108. The principal advantage afforded by the embodiment of cylindrical air inlet conduit 108 over the conduit 88 shown in the preceding figures is a saving in expense of manufacturing the same and also in providing a substantial amount of frictional surfaces which coengage each other on the conduit 108 and cylindrical bracket 106.

When the beater unit 56 is revolving at normal speed, and particularly if the level 92 of the mix in the compartment 22 is near the upper limit intended to be used by the machine, there is somewhat of a tendency for splash of the beaten mix to occur and even a further possibility of the same tending to seep from beneath the edges of the door 12 which covers the opening 14 in the top of the cabinet 10. To preclude this possibility from occurring however, the present invention includes the use of a deflector member 112 best shown in FIG. 8. It may be supported adjacent the corner of the opening 14 shown in FIG. 1 by any suitable means such as reversely bent flanges 114 which frictionally engage the upstanding rims 116 around opening 14 so as to maintain the deflector member 112 firmly in place. When the cover 112 is closed as shown in FIG. 1, said cover additionally aids in maintaining the member 112 in operative position.

To facilitate the presence of adequate air in the upper portion of the compartment 22 at all times, the cover 12 preferably is provided with a suitable air inlet opening 118 shown in FIG. 1, such opening insuring a suitable amount of air always being present particularly in the upper portion of the compartment 22 where the same is available for suction thereof through the inlet conduits 88 or 108 of the several embodiments into the confined portion in the lower regions of the compartment 22 for the purposes of beating the air into the mix and thereby producing a desired amount of overrun in accordance with the principles of the invention.

While the invention has been described and illustrated in its several preferred embodiments, it should be understood that the invention is not to be limited to the precise details herein illustrated and described since the same may be carried out in other ways falling within the scope of the invention as claimed.

We claim:

1. A frozen confection-making machine comprising a trough-like freezing compartment having means to induce freezing therein and a product exit in an end of the lower portion thereof, a beater rotatable about a substantially horizontal axis in said lower portion of said compartment and having impeller means operable to scrape frozen confection from the walls of said lower portion and move it from one end of said compartment toward said exit end thereof, a shield overlying said beater partially of the length of said compartment and having inlet means adjacent said one end of said compartment of less area than the cross-sectional area of the mass of confection capable of being moved by said beater beneath said shield through a circulatory path toward said exit end and then reversely over said shield toward said one end of said compartment for constricted reintroduction into the agitating region beneath said shield, and air-introduction means extending downward from a level above the mix in said compartment toward said shield and operable to produce overrun in said confection as beaten and frozen in said machine, said introduction of air being continued while the mix is being recirculated through said region in a constricted manner.

2. A frozen confection-making machine comprising a trough-like freezing compartment having means to induce freezing therein and a bottom portion constituting substantially the segment of a cylinder and having spaced sides extending upwardly therefrom, one end of said bottom portion having discharge means therein, a beater rotatable in the cylindrical lower portion of said compartment and having impellers arranged to move a confection mix from one end of said compartment toward the other as the same progressively is frozen, a shield overlying said beater and extending from a position near one end of said compartment toward the other end to define a beating and air-entraining region of less length than said compartment, said shield having inlet means for said mix adjacent one end of said region and of less area than the cross-sectional area of said region within which the beater rotates to permit constricted admittance of mix to said region, and air inlet conductor means adjacent said one end of said compartment and extending downward from above the mix level substantially to said region to permit the drawing of air by suction into said region when said beater is rotating to provide overrun in the frozen confection produced by said machine.

3. The machine set forth in claim 2 further characterized by said shield also being substantially a segment of a cylinder of substanially the same diameter as that comprising the bottom portion of said compartment and cooperating with said bottom portion to enclose relatively closely said rotatable beater.

4. The machine set forth in claim 3 further characterized by the edges of said shield normally abutting the inner surface of said trough-like compartment and said shield being movable upwardly desired amounts to space the edges of said shield adjustable desired distances from the cylindrical bottom portion of said compartment and thereby provide additional inlet spaces to permit the passage of mix from said compartment into said beating and air-entraining region and vary the suction created in said region, whereby the amount of air introduced into said mix may be varied to produce a desired overrun in the confection product.

5. The machine set forth in claim 2 further including bracket means carried by the end of said compartment opposite the end having discharge means therein, said air inlet conductor means comprising a tubular member having a longitudinal slot along one side receiving said bracket means to slidably support said tubular member upon said bracket means, and said shield being connected at one end to the lower end of said tubular member for support thereby.

6. The machine set forth in claim 5 further characterized by said bracket means comprising a longitudinally hollow member connected along one side to said end of said compartment and exteriorly complementary in shape to the interior of said tubular air inlet conductor which is longitudinally slidable thereon in opposite directions in a substantially vertical direction to effect movement of said shield toward and from said beater.

7. The machine set forth in claim 5 further characterized by said hollow bracket member being substantially cylindrical and said tubular air inlet conductor also being substantially cylindrical and frictionally engaging said bracket member to maintain said shield in selected adjusted positions, both ends of said bracket member and conductor being open to permit free passage of air therethrough from the upper portion of said compartment to said air-entraining region below said shield.

8. The machine set forth in claim 1 further including deflector means connected to the upper portion of said compartment and extending from the exit end of said compartment toward the other end thereof and operable to engage beaten mix discharged from said agitating region and deflect the same back into said compartment toward the constricted inlet to said agitating region.

9. A frozen confection-making machine comprising an elongated freezing compartment having means to induce freezing therein and an inlet for mix material adjacent one end and a product exit at one end, a beater rotatable in said compartment and having impeller means operable to move frozen confection longitudinally relative to the walls of said compartment so as to be chilled and frozen while passing therealong toward said exit end thereof, means defining a confined portion within said compartment of less length than said freezing compartment and through which said confection is moved by said beater while being beaten by said beater and reduced in temperature, said confined portion adjacent the entrance end thereof having flow-constricting inlet means of less cross-sectional area than the cross-sectional area of said confined portion and discharge means at the other end of said confined portion to define a recirculating closed path within said compartment for the confection while being frozen so as to continuously move the same from said discharge means in a reverse direction past said confined portion to said inlet means thereof for constricted reintroduction into said confined portion, and air inlet means open to atmosphere and extending downward from a level above the mix in said compartment toward the constricted inlet to said confined portion and operable to introduce air at atmospheric pressure into said mix adjacent aid constricted inlet to produce overrun in said confection as beaten and reduced in temperature in said machine, said introduction of air being continued while the mix is being recirculated through said confined portion and introduced thereinto in a constricted manner.

10. The machine set forth in claim 3 further including a member movable radially relative to axis of said beater for adjustable positioning and comprising part of said means defining said flow constricting inlet means for said confined portion and operable when adjusted to vary the amount of constriction afforded the mix entering said confined portion and thereby varying the amount of air drawn into said mix and correspondingly varying the amount of overrun produced in said confection.

11. The machine set forth in claim 3 further including a member positioned above said beater and in conjunction with certain walls of said compartment defining said confined portion, said member extending along said compartment only partially toward said exit end thereof to permit discharge of beaten and chilled confection from said confined portion for recirculation above said member and back to said constricted inlet to said confined portion in said container.

12. The machine set forth in claim 11 further characterized by said member having one end spaced a predetermined distance from the end of said compartment opposite said exit end to define the constricted inlet for confection to said confined portion.

13. The machine set forth in claim 12 further characterized by said air inlet comprising tubular means adjacent said spaced end of said member and extending upwardly therefrom to a level above that of said mix in said compartment, thereby to provide an unimpeded air inlet and the lower end of said tubular means being adjacent said member to permit the mix flowing into said confined portion through said constricted inlet to create a negative pressure operable to draw air positively into said mix by suction so as to be beaten thereinto and form overrun.

14. The process of producing a frozen confection having overrun therein comprising the steps of circulating a liquid mix along a substantially predetermined closed path in a freezing container from one end toward the other through an agitating zone and reversely past the same for reintroduction thereto, adjustably constricting the flow of said mix at the inlet to said agitating zone while permitting relatively free discharge passage from said agitating zone to produce a desired degree of suction at said inlet to said zone, and introducing air at atmospheric pressure and by suction to said inlet end of said zone for incorporation into said mix in quantities regulated by said adjusted degree of suction as it is progressively agitated and frozen.

References Cited by the Examiner

UNITED STATES PATENTS

| | | | |
|---|---|---|---|
| 1,769,275 | 7/30 | Rice | 259—147 XR |
| 1,993,130 | 3/35 | Ballew | 62—342 |
| 2,210,366 | 8/40 | Godfrey et al. | 62—342 |
| 2,281,944 | 5/42 | Miller et al. | 62—354 |
| 2,461,746 | 2/49 | Lathrop et al. | 259—151 XR |
| 2,538,465 | 1/51 | Marco | 259—109 XR |
| 2,740,262 | 4/56 | Stalkup | 62—342 |
| 2,743,197 | 4/56 | Hastings | 259—25 XR |
| 2,784,565 | 3/57 | Stalkup | 62—348 |

ROBERT A. O'LEARY, *Primary Examiner.*

EDWARD J. MICHAEL, *Examiner.*